Patented Dec. 19, 1950

2,534,238

UNITED STATES PATENT OFFICE 2,534,238

8-HALOXANTHINE SALTS OF α-PHENYL-α-2-PYRIDYLALKYL DIALKYLAMINOALKYL ETHERS AND THE PRODUCTION THEREOF

John W. Cusic, Skokie, Ill., assignor to G. D. Searle & Co., Chicago, Ill., a corporation of Illinois No Drawing. Application July 2, 1949, Serial No. 102,957

14 Claims. (Cl. 260—253)

1

This invention relates to compositions of matter comprising halogenated xanthines and basic ethers of the general formula

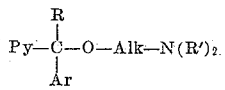

wherein Py represents a pyridyl radical, preferably an α-pyridyl radical; Ar represents an aryl radical, preferably a phenyl radical; R represents hydrogen or a lower alkyl radical, such as methyl or ethyl; Alk represents a lower alkylene radical, such as ethylene or propylene; and R' represents a lower alkyl radical, such as methyl, ethyl, or propyl. More particularly this invention relates to salts of 8-haloxanthines which contain a hydrogen atom in position 7 and organic bases of the foregoing formula, as well as to processes for preparing such salts.

This application is a continuation-in-part of my copending application Serial No. 71,763, filed January 19, 1949.

It is known that basic ethers of the foregoing type elicit certain undesirable side reactions and toxic manifestations following administration as medicinal agents. Most common of these effects are drowsiness, dizziness, and in certain instances nausea. It is the object of this invention to produce therapeutic compositions of matter which are relatively free from untoward reactions. Another object is to produce compositions of reduced toxicity. A further object is to produce preparations having enhanced therapeutic activity. Other objects will be apparent to those skilled in the art, in view of the following disclosure.

I have discovered that salts of 8-haloxanthines with basic ethers of the type disclosed hereinabove produce little effect on the central nervous system and are therapeutically more useful than either of the individual components alone. Further such salts appear to exert a potentiating effect and have enhanced activity over that of the constituents. Such compounds are useful in the treatment of allergic manifestations, as well as for the treatment and suppression of undesirable side effects commonly observed in the use of common antihistaminic drugs.

Among the halogenated xanthines to which this invention pertains are the chloro, bromo, and iodo derivatives of theophylline, and related xanthines which have a hydrogen atom in position 7.

In particular this invention is concerned with acidic xanthines such as 8-chlorotheophylline
8-bromotheophylline
8-chloroxanthine
3-methyl-8-chloroxanthine
8-bromoxanthine
3-methyl-8-bromoxanthine
1,3-diethyl-8-bromoxanthine
1,3-diethyl-8-chloroxanthine
8-iodotheophylline
8-iodo-1,3-diethylxanthine Compositions of organic bases and haloxanthines are readily prepared by dissolving the base in a suitable solvent and treating the resulting solution with a solution of a halogenated xanthine. Solvents which are satisfactory for this reaction include the lower alcohols and ketones and their mixtures with water, ethers and hydrocarbons. Generally small excesses of the basic ether are desirable in these synthetic procedures. The desired salt generally crystallizes out of the solution on chilling or standing, or may be precipitated by addition of a solvent such as ether or benzene. A simple and efficient alternative method is that of heating together at 50–100° C. equivalent amounts of the liquid basic ether and of the haloxanthine, with good mixing with a small amount of water or alcohol. As the materials react the mixture generally forms a thick paste or granular solid. On chilling the product becomes hard and solid and may be broken up, ground to a powder and dried. The compounds of this invention can also be produced by refluxing a solution of an ammonium salt of a haloxanthine in a lower alcohol or ketone with an equivalent of the basic ether. During the heating, ammonia is evolved and the haloxanthine salt of the organic base is formed. On chilling this salt precipitates.

The following examples illustrate in more detail my invention, but in no way are to be construed as limiting it in spirit or in scope.

*Example 1*

5 g. of α-2-pyridyl-α-phenylethyl β-dimethylaminoethyl ether [which is also named as β-dimethylaminoethyl 1 - α - pyridyl - 1 - phenylethyl ether or as 2-(α-(2-dimethylaminoethoxy)-α-methylbenzyl) pyridine] and which has the formula

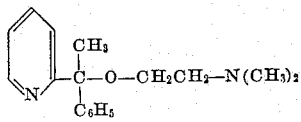

and 4 g. of 8-chlorotheophylline are dissolved in a hot mixture of 50 cc. of methyl ethyl ketone and 10 cc. of water. The hot solution is filtered, chilled, and diluted with ether. An oily precipitate of the 8-chlorotheophylline salt separates. This is removed and dried at 60–65° C. It soon crystallizes at this temperature and is recrystallized from ethyl acetate. The 8-chlorotheophylline salt of α-2-pyridyl-α-phenylethyl β-dimethylaminoethyl ether melts at 148–150° C.

*Example 2*

5 g. of α-2-pyridyl-α-phenylpropyl β-dimethylaminoethyl ether which has the formula

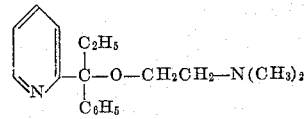

and 4.55 g. of 8-bromotheophylline are dissolved in a boiling mixture of 55 cc. of methyl ethyl ketone and 10 cc. of water. The hot solution is filtered and evaporated on the steam bath. There is thus obtained a residue of the 8-bromotheophylline salt of α-2-pyridyl-α-phenylpropyl β-dimethylaminoethyl ether. This salt is triturated with cold acetone and then dried at 60–65° C.

*Example 3*

12 g. of β-dimethylaminoethyl phenyl-α-pyridylmethyl ether which has the formula

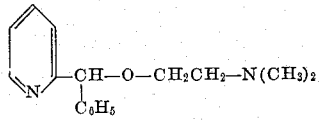

and 8 g. of 8-chlorotheophylline are dissolved in 100 cc. of hot methyl ethyl ketone. The solution is filtered and ether is added to the chilled filtrate until a precipitate of 8-chlorotheophylline salt of β-dimethylaminoethyl phenyl-α-pyridylmethyl ether forms. A sample of this product on analysis showed 7.32% nitrogen (calculated 6.83%).

I claim:

1. An 8-haloxanthine salt of a basic ether of the formula

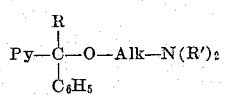

wherein Py is a pyridyl radical, R is a member of the group consisting of hydrogen and lower alkyl radicals, Alk is a lower alkylene radical and R' is a lower alkyl radical, and wherein the 8-haloxanthine contains a hydrogen atom in position 7.

2. An 8-haloxanthine salt of a basic ether of the formula

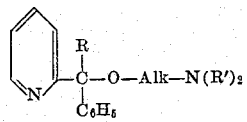

wherein R is a lower alkyl radical, Alk is a lower alkylene radical and R' is a lower alkyl radical, and wherein the 8-haloxanthine contains a hydrogen atom in position 7.

3. An 8-haloxanthine salt of a basic ether of the formula

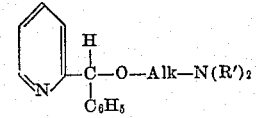

wherein Alk is a lower alkylene radical and R' is a lower alkyl radical, and wherein the 8-haloxanthine contains a hydrogen atom in position 7.

4. An 8-haloxanthine salt of a basic ether of the formula

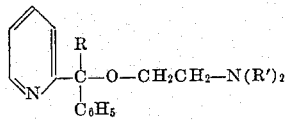

wherein R is a lower alkyl radical and R' is a lower alkyl radical, and wherein the 8-haloxanthine contains a hydrogen atom in position 7.

5. An 8-haloxanthine salt of a basic ether of the formula

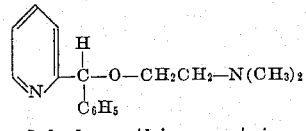

wherein the 8-haloxanthine contains a hydrogen atom in position 7.

6. An 8-halotheophylline salt of a basic ether of the formula

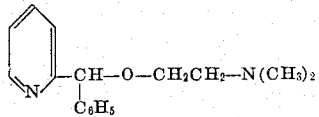

7. An 8-halotheophylline salt of a basic ether of the formula

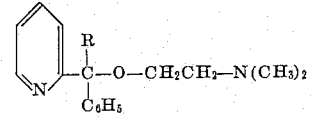

wherein R is a lower alkyl radical.

8. An 8-halotheophylline salt of a basic ether of the formula

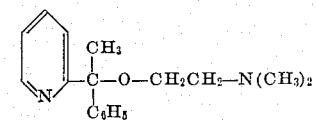

9. The 8-chlorotheophylline salt of a basic ether as in claim 6.

10. The 8-chlorotheophylline salt of a basic ether as in claim 8.

11. The process of producing an 8-haloxanthine salt of a basic ether of the formula

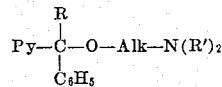

wherein Py is a pyridyl radical, R is a member of the group consisting of hydrogen and lower alkyl radicals, Alk is a lower alkylene radical and R' is a lower alkyl radical, which comprises mixing a member of the group consisting of an 8-haloxanthine which contains a hydrogen atom in position 7 and the ammonium salt thereof with said basic ether, dissolving the mixture in an inert water-soluble organic solvent at an elevated temperature and separating the salt thus formed.

12. The process of claim 11 wherein the solvent is methyl ethyl ketone.

13. The process of producing the 8-chlorotheophylline salt of α-2-pyridyl-α-phenylethyl β-dimethylaminoethyl ether which comprises dissolving equivalent amounts of 8-chlorotheophylline and the basic ether in hot dilute methyl ethyl ketone, evaporating the solvent and crystallizing the residual salt from an organic solvent.

14. The process of producing the 8-chlorotheophylline salt of β-dimethylaminoethyl phenyl-α-pyridylmethyl ether which comprises dissolving equivalent amounts of 8-chlorotheophylline and the basic ether in hot methyl ethyl ketone, chilling the resulting solution and separating the salt thus formed.

JOHN W. CUSIC.

No references cited.